United States Patent [19]

Faulkner et al.

[11] 4,412,909

[45] Nov. 1, 1983

[54] PROCESS FOR RECOVERY OF OIL FROM SHALE

[75] Inventors: Bobby P. Faulkner, New Berlin; Michael H. Weinecke, Franklin, both of Wis.

[73] Assignee: Allis-Chalmers Corporation, Milwaukee, Wis.

[21] Appl. No.: 336,266

[22] Filed: Dec. 31, 1981

[51] Int. Cl.³ .......................... C10B 53/06; C10G 1/00
[52] U.S. Cl. ................................. 208/11 R; 208/8 R; 201/32
[58] Field of Search ............... 208/8 R, 11 R; 201/28, 201/29, 32

[56] References Cited

U.S. PATENT DOCUMENTS

| | | | |
|---|---|---|---|
| 3,325,395 | 6/1967 | Ban | 208/8 R |
| 3,483,115 | 12/1969 | Haddad et al. | 208/11 R |
| 3,560,369 | 2/1971 | Rowland et al. | 201/32 X |
| 3,644,193 | 2/1972 | Weggel et al. | 201/29 X |
| 3,668,077 | 6/1972 | Ban | 201/32 X |
| 4,039,427 | 8/1977 | Ban | 201/32 X |
| 4,058,905 | 11/1977 | Knight | 208/11 A |
| 4,258,005 | 3/1981 | Ito et al. | 201/31 X |

Primary Examiner—Delbert E. Gantz
Assistant Examiner—Glenn A. Caldarola
Attorney, Agent, or Firm—Lee H. Kaiser

[57] ABSTRACT

A method and apparatus for recovering oil from shale comprises forming a bed of oil bearing shale particles on a plurality of rotatable apertured cylindrical rollers having filler members in the nip between adjacent rollers; transporting the bed by rotating the rollers to frictionally engage the shale particles and transfer them onto and across the filler members to continuously agitate the particles as they are being transported at a velocity substantially lower than the circumferential velocity of the rollers; passing through the moving bed at spaced points a plurality of discrete streams of nonoxidizing gas heated to different temperatures sufficiently high to educe different weight fractions of oil from the kerogen in the shale as vapors into the gas streams; and separating the different weight oil fractions from the gas streams. Preferably the heated nonoxidizing gas streams exiting the retorting zones are passed through the moving bed upstream from distillation of the volatile oil constituents to preheat the moving bed and condense the educted oils which become suspended as stable mists that can be separated from the gas streams.

21 Claims, 3 Drawing Figures

FIG. 3

PROCESS FOR RECOVERY OF OIL FROM SHALE

BACKGROUND OF THE INVENTION

1. Field of the Invention

This invention relates to processes and apparatus for extraction of oil from a moving bed of carbonaceous materials such as oil shale.

2. Description of the Prior Art

Systems for retorting a moving bed of oil shale supported on a traveling grate by passing heat transfer gas streams through the bed to transfer heat directly to the shale are disclosed in such U.S. patents as U.S. Pat. Nos. 3,325,395 to Ban; 3,560,369 to Rowland et al; 3,644,193 to Weggel et al and 3,475,279 to Bowman. The oil shale bed is essentially static (in the sense that the shale particles do not move relative to the grates) as it is transported by the traveling grate in the systems disclosed in such patents and consequently the gas-to-solid contact is relatively low, a high drop exists in the pressure across the bed required to force the heat transfer gas streams through the bed and relatively high horsepower motors are required to drive the traveling grate chain and the fans which force the gas streams through the static bed. The low gas-to-solid contact in such "static" shale bed supported on a traveling grate substantially increases the retorting time required to distill the volatile oil products from the shale particles and consequently results in increased cracking of the oil products to less desirable gases and carbon. Further, such "static" shale beds supported on a traveling grate are susceptible to being flooded by liquid kerogen distilled from the oil bearing shale particles. Channeling occurs frequently in such "static" shale bed supported on a traveling grate, and such channeling results in: (a) loss of pressure; (b) decrease in heat transfer efficiency; and (c) recovery of less oil from the shale, thereby reducing overall efficiency. Sealing of a traveling grate supporting a shale bed against entry of oxygen and loss of heat is extremely difficult, and also a significant amount of heat energy is wasted as the traveling grate plates and grate chain return.

The system of the U.S. Pat. No. 3,644,193 patent has the above discussed disadvantages of a "static" shale bed supported upon a traveling grate and is incapable of separating different weight fractions of oil from the shale particles. The system of the U.S. Pat. No. 3,560,369 patent requires crushing, grinding and screening of the oil shale to segregate the fines; agglomerating the fines with a binder such as heavy oil; and then forming a bed on the traveling grate with the agglomerated fines occupying a middle layer between upper and lower layers of larger shale particles. The rate of transfer of heat from the radiant heaters of U.S. Pat. No. 3,475,279 to the shale particles is very low in comparison to a moving bed system wherein a heated gas steam is passed through the moving shale bed, and both retorting and sintering of the coal or shale particles occur in the same zone in this patent which does not permit close control of the temperature to which the particles are heated and also results in mixing of the desired volatile products with the combustion gases and cracking of the hydrocarbons. Ambient air rather than a nonoxidizing, or neutral gas is passed through the moving shale bed in the second, or sintering zone of the traveling grate system shown in FIG. 4 of the U.S. Pat. No. 3,325,395 and burned with the carbon in the shale particles. Such arrangement does not permit control of the oil fraction educted and also mixes the combustion gases with the desired condensable products.

Rotary kiln systems for tumbling and retorting a bed of oil shale particles are disclosed in such U.S. patents as U.S.Pat. Nos. 1,383,205; 1,423,716; 1,717,786; 2,441,386; 2,664,389; 3,496,094 and 3,844,929, but such rotary kiln shale retorting systems are incapable of separating different fractions of oil from the shale and have the disadvantages that the shale particles can only occupy a small portion of the kiln cross section, e.g., 14 percent, with the result that the tonnage capacity per unit size of apparatus is relatively low and that combustion and retorting occur in the same vessel, which results in low efficiency and in at least partial cracking of the hydrocarbons within the kiln.

SUMMARY OF THE INVENTION

A moving bed oil shale retorting method and apparatus in accordance with the invention continually agitates oil bearing shale particles of the moving bed to improve solid-to-gas contact and passes through the bed at spaced apart points a plurality of discrete neutral, i.e., oxygen-free or nonoxidizing gas streams heated to different temperatures sufficiently high to vaporize and educe different gaseous components from the kerogen in the shale as vapors into the gas streams to concentrate the gaseous components in the discrete gas streams and extract them from the shale particles. Preferably the neutral gas streams comprise high heat capacity gases. In the preferred embodiment of the invention the discrete gas streams are heated to different oil educting temperatures to educe different weight fractions of oil from the shale. The heated gas streams are also passed through the moving shale bed upstream from distillation of the volatile oil constituents to: (a) preheat the moving bed; and (b) condense the educted oils which become suspended as stable mists and are mechanically separated from the inert gas streams. Heat energy is removed from the spent shale particles by burning them with combustion air downstream from the retorting sites and such heat energy is transferred to the nonoxidizing gas streams to raise them to oil educting temperatures, thereby assuring optimum efficiency.

Preferably the bed of oil shale particles is supported upon a plurality of rotatable apertured horizontal rollers with elongated stationary filler bars in the nip between adjacent rollers, and the rollers frictionally engage the particles and move them onto and across the filler bars to continually agitate the particles and transport them through a plurality of retorting zones in which nonoxidizing heat transfer gas streams heated to different oil educting temperatures are passed through the moving shale bed to extract different weight fractions of oil from the particles. The continuous tumbling of the shale particles substantially increases: (a) solid-to-gas contact, and (b) efficiency relative to the percentage of oil recovered based upon Fisher Assay in comparison to traveling grate retorting apparatus; eliminates channeling; reduces retorting time; and also reduces the pressure across the bed required to force the oil educting nonoxidizing gas streams through the bed as well as the horsepower of the motors which drive the fans for such gas streams. High heat capacity nonoxidizing gas streams permit significant reduction in the oil educting temperature in comparison to relatively low heat capacity gases.

The moving shale bed may also be transported by the rotatable rollers through preheating zones upstream from the retorting zones wherein the neutral heat transfer gas streams are passed through the moving bed to condense the oil that was driven off in the retorting zones and to preheat the oil bearing shale particles before the volatile oil constituents are distilled therefrom in the retorting zones. Further, the moving bed of spent shale particles may be transported by the rotatable rollers through a combustion zone wherein a stream of combustion air is passed through the bed and burned with the carbon in the spent particles to extract the heat energy therefrom. The heated combustion air stream exiting the combustion zone is then passed through a heat exchanger wherein the sensible heat energy is transferred to the nonoxidizing gas streams to raise them to oil educting temperatures before they enter the retorting zones. Preferably the rollers also transport the spent shale particles through a cooling zone downstream from the combustion zone wherein the combustion air stream is passed through the shale bed before it is conveyed to the combustion zone to thereby preheat the combustion air and cool the spent shale particles.

The nonoxidizing gas streams having different weight fractions supspended therein as stable mists exiting the preheating zones are sent respectively to a first separation stage wherein the condensed lighter and less viscous and more hydrogenated oils are removed from first nonoxidizing gas stream and to a second separation stage wherein the condensed heavier, more viscous hydrogen deficient oils are removed from the second nonoxidizing gas stream. The type of oil distilled in each of the plurality of retorting zones is controlled by the oil educting temperatures and the flow rate of the respective nonoxidizing gas streams. After the oil mists are stripped from the nonoxidizing gas streams in the separation stages, a portion of such nonoxidizing gases are preferably recycled to the heat exchanger wherein they are reheated to oil educting temperatures and returned to the retorting zones. After the gases exiting the combustion zone are passed through the heat exchanger, they still contain a significant amount of medium level sensible heat than can be used, for example, in a waste heat boiler to generate steam.

BRIEF DESCRIPTION OF DRAWINGS

FIG. 1 shows diagrammatically a moving bed oil shale retorting apparatus in which roller grate apparatus for transporting the bed and agitating the shale particles is illustrated in side elevation and partially in section;

FIG. 2 is an enlarged view of several rollers of the FIG. 1 roller grate apparatus with filler bars disposed in the nip there between.

DESCRIPTION OF THE PREFERRED EMBODIMENTS

Figures 1, 2:
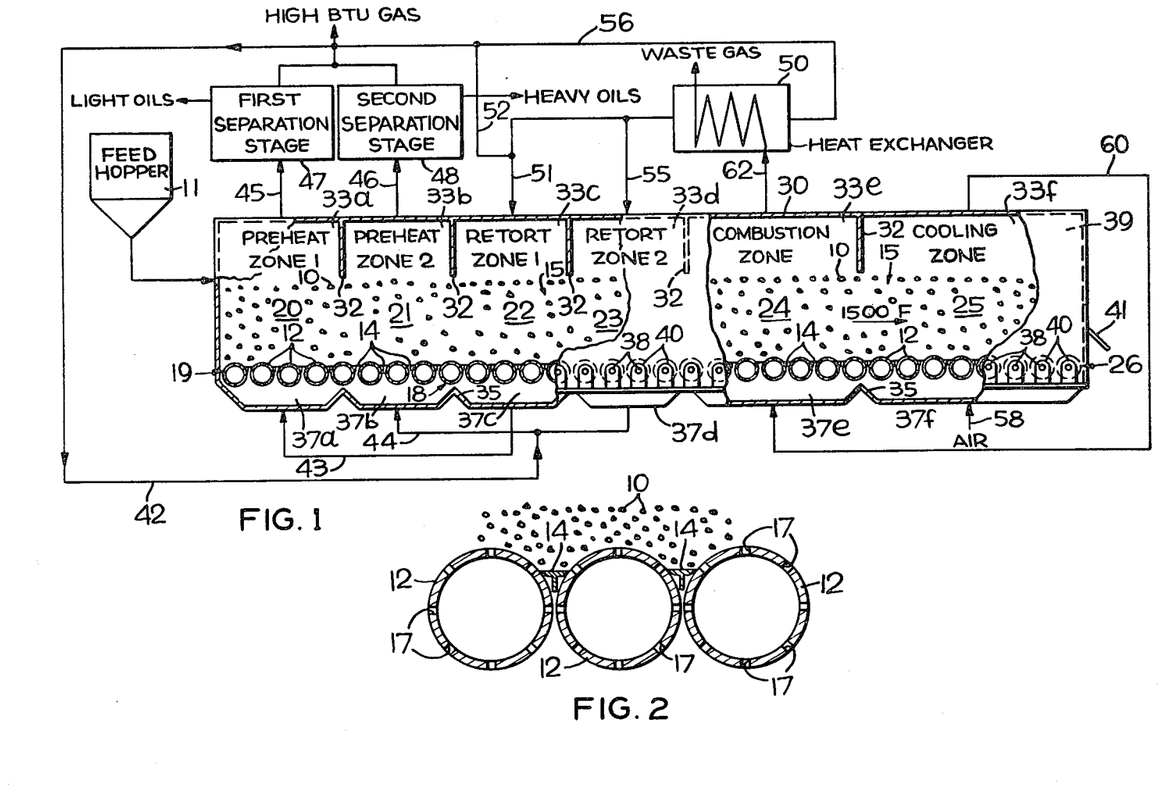

Referring to FIG. 1 of the drawing, oil bearing raw shale particles 10 that have preferably been crushed to a size between ¼" and 3" are discharged from a feed hopper 11 onto a plurality of horizontal elongated apertured rotatable cylindrical rollers 12 and stationary elongated filler bars 14 positioned in the nip between rollers 12 to form a bed 15 of shale particles 10 thereon. Cylindrical rollers 12 are rotated in the same direction so that their cylindrical surfaces frictionally engage the shale particles 10 and transport them onto and across the stationary filler bars 14 whose upper surfaces are disposed below the upper surfaces of rollers 12 to thereby continuously agitate and tumble particles 10. The moving shale bed 15 may be termed a "dynamic" bed in contrast to a "static" moving bed on a traveling grate wherein the particles do not move relative to the traveling grate plates. Cylindrical rollers 12 may be hollow and have a plurality of radially extending gas passage apertures, or slots 17 communicating with the interior thereof. Gas passage apertures 17 may be elongated in a direction parallel to the roller axis or may be in the form of circumferential or spiral slots through the cylindrical roller surfaces. Rollers 12 and filler bars 14 form a general flat surface for shale bed 15 having constantly moving portions which continuously agitate and tumble the shale particles 10 and urge bed 15 in a direction transverse to the axes of rollers 14 at a velocity which is only a minor fraction of the circumferential velocity of rollers 12. The rollers 12 and filler bars 14 may constitute a roller grate 18 of the type disclosed in U.S. Pat. Nos. 4,270,899 and 4,269,593 to Faulkner et al both of which have the same assignee as this invention.

In the embodiment of the invention illustrated in FIG. 1 roller grate 18 transports shale bed 15 from the grate inlet end 19 in sequence through a first preheat zone 20, a second preheat zone 21, a first retorting zone 22, a second retorting zone 23, a combustion zone 24 and a cooling zone 25 and discharges the spent shale particles from the grate exit end 26. A gas-confining housing structure 30 encloses roller grate 18 and moving shale bed 15. A plurality of depending partitions 32 within housing structure 30 divide the portion thereof above roller grate 18 into a plurality of hood structures 33a–33f, and a plurality of upwardly inclined bottom wall portions 35 generally in vertical alignment with partitions 32 divide the portions of housing structure 30 below roller grate 18 into a plurality of wind box structures 37a–37f disposed below the hood structures 33a–33f. Each bottom wall portion 35 may be of inverted-V cross section as shown or alternatively may have a flat roof section extending adjacent the lower periphery of one or more rollers 12. Hood structure 33a and wind box structure 37a together define first preheat zone 20; hood structure 33b and wind box structure 37b together define second preheat zone 21; hood structure 33c and wind box structure 37c together define first retorting zone 22; hood structure 33d and wind box structure 37d together define second retorting zone 23; hood structure 33e and wind box structure 37e together define combustion zone 24; and hood structure 33f and wind box structure 37f together define cooling zone 25.

Cylindrical rollers 12 may be attached to elongated shafts 38 which pass through the sidewalls 39 of housing structure 30 and are journalled at their ends for rotation about their longitudinal axes in nonfriction bearings 40 outside of housing 30. Suitable seals (not shown) may be provided between shafts 38 and sidewalls 39 of housing 30, and it will be appreciated that such seals can be simpler than the sealing means required for a traveling grate wherein the grate chains pass through the heat transfer chamber. Each roller shaft 38 may have a sprocket (not shown) attached to one end for engagement with a driving chain (not shown). Drive means for a plurality of rollers are well known such as disclosed on U.S. Pat. No. 3,438,491 and are omitted in order to simplify the description.

In first preheating zone 20 the raw shale particles 10 of bed 15 are partially preheated by the nonoxidizing off-gases from first retorting zone 22 which comprise a first nonoxidizing gas stream and are passed through bed 15 within zone 20 as the particles 10 are tumbled by rollers 12. The off-gases from first retorting zone 22, which may be at 500° F., are conveyed to first preheating zone 20 through a conduit 43 connected at one end to wind box structure 37c and at the opposite end to wind box structure 37a and are forced updraft through bed 15 to preheat the shale particles 10 and are cooled to condensing temperature. The relatively light educted oil fraction entrained in the first nonoxidizing gas stream from first retorting zone 22 is condensed as first gas stream passes through bed 15 and is cooled to condensing temperature in first preheating zone 20. The oils distilled in first retorting zone 22 and condensed in first preheat zone 20 become suspended as a stable oil mist in the first gas stream and are: (a) lighter; (b) less viscous; (c) more hydrogenated; and (d) require less subsequent treatment (i.e., hydrogenation), than the oils volatized in second retorting zone 23. The first nonoxidizing gas stream having such lighter oil mist entrained therein is sent through a conduit 45 which communicates with hood structure 33a to a demisting device such as an electrostatic precipitator which comprises a first oil-gas separator stage 47 and removes the condensed oils from the first nonoxidizing gas stream.

The fans for forcing the neutral heat transfer gas streams through shale moving bed 15 and the motors for driving such fans are omitted from the drawing in order to simplify the description and facilitate understanding of the invention.

When oil shale particles 10 are heated, chemical bonds within the carbonaceous kerogen organic material are broken to release volatile liquid and gaseous products. The term "retorting" denotes thermal conversion of kerogen organic matter to oil vapors and gas, thereby leaving solid particulate spent shale. Oil shales vary widely in the percent of kerogen they contain as well as the quantity of magnesium and calcium carbonates that decompose endothermally upon heating. In general, western oil shales contain large quantities of magnesium carbonates, and their rate of burning must be carefully controlled if it is desired to prevent clinkering and excessive mineral carbonate decomposition.

When the kerogen is retorted, a normally gaseous fraction, a normally liquifiable vaporous fraction and an organic residue are formed. When the ratio of hydrogen to carbon in the liquid product is high, the distilled oil is lighter with a lower density and a lower viscosity. A more highly hydrogenated oil is desirable because the lighter, less viscous oil is easier to transport. However, if the lighter oils are subjected to excessive temperature for long periods of time, they are undesirably cracked to: (1) gases with a higher hydrogen/carbon ratio, and (2) fixed carbon.

The oil educting temperatures to which the first and second nonoxidizing gas streams are heated will vary dependent upon whether eastern or western shale is being retorted. In general, the hydrogen/carbon ratio of the products distilled from kerogen is higher in western than in eastern shales, and oils and gases start to be released at a lower temperature from eastern shales. Consequently the oil educting temperature of the first gas stream passed through bed 15 in first retorting zone 22 is lower when eastern shale is being retorted and also the temperature of particles 10 exiting second preheating zone 21 is lower.

The oil shale particles 10 of bed 15 transported by rollers 12 from first preheating zone 20 to second preheating zone 21 are further heated by the nonoxidizing off-gases from second retorting zone 23 which comprises a second neutral gas stream and are passed through bed 15 within second preheat zone 21 as the shale particles are agitated by rollers 12 to further preheat the oil bearing particles to approximately 400° F. and to cool the second gas stream to condensing temperature. The off-gases from second retorting zone 23, which may be at 750° F., are conveyed to second preheating zone 21 through a conduit 44 which is connected at its opposite ends to wind box structures 37b and 37d and has a joint intermediate its ends with a conduit 42 conveying relatively cool nonoxidizing recycled gases from the first and second oil-gas separation stages 47 and 48 and which lower the temperature of the off-gases from second retorting zone 23 before they pass through bed 15 in second preheating zone 21. The educted oil in the off-gases or second nonoxidizing gas stream from second retorting zone 23 is condensed as such second gas stream is passed updraft through bed 15 in second preheating zone 21 to further preheat bed 15 and cool the second gas stream to condensing temperature so that the educted oils become suspended as a stable mist therein. The oils volatized, or distilled from the oil bearing shale particles 10 in second retorting zone 23 are the heavier, hydrogen deficient oil fraction, and the second nonoxidizing gas stream with said heavier oils entrained therein are sent through a conduit 46 which communicates with hood structure 33b to second oil-gas separator stage 48 where the heavier, more viscous oils are removed from the second nonoxidizing gas stream.

The oil shale particles 10 of bed 15 transported by rollers 12 from second preheating zone 21 to first retorting zone 22 may be at approximately 400° F. Nonoxidizing recycled gases from which oil mist is stripped in first and second separator stages 47 and 48 may be conveyed through a conduit 56 to a heat exchanger 50 which heats them to a temperature of approximately 1200° F. at which they enter a conduit 51 which communicates with hood structure 33c. Conduit 51 has a joint with a conduit 52 carrying relatively cool recycled gases from the first and second separator stages 47 and 48 and which cool the gases conveyed through conduit 51 to approximately 850° F. Such cooled gases conveyed by conduit 51 constitute the first nonoxidizing gas stream having a temperature in the range from 600° F. to 900° F. which is passed downdraft through bed 15 in first retorting zone 22 to raise particles 10 to an oil educting temperature of approximately 500° F. which drives off a lighter and less viscous fraction of oil from the shale particles.

A conduit 55 which communicates at one end with hood structure 33d has a joint with conduit 51 and receives and conveys to second retorting zone 23 recycled nonoxidizing gases which have been heated to approximately 1200° F. in heat exchanger 50 and constitute the second nonoxidizing gas stream. The oil shale particles 10 of bed 15 are transported by rollers 12 from first retorting zone 22 to second retorting zone 23 where they are further heated by the second nonoxidizing gas stream which is passed downdraft through bed 15 within second retorting zone 23 to raise particles 10 of bed 15 to a higher oil educting temperature of approximately 900°–1000° F. Such temperature will volatize a heavier, hydrogen deficient oil fraction from the oil bearing particles 10, but the temperature of the second gas stream is in the range of 900° F. to 1200° F. which is below the cracking temperature of the educted oils, i.e., is not sufficiently high to crack a significant percentage of the oils to gases with a high hydrogen to carbon ratio during the relatively short residence time of such gas stream within retorting zone 23. it will be appreciated that the type of oil produced is each of a plurality of retorting zones such as 22 and 23 can be controlled by changing the temperature of the oil educting gas streams passed through the oil shale bed 15.

As discussed above, the temperatures of the first and second nonoxidizing gas streams passed through bed 15 in first and second retorting zones control the type and amount of oil distilled into the gas streams. The first and second nonoxidizing gas streams preferably comprise high heat capacity gases which permit the oil educting temperatures to be significantly reduced in comparison to gas streams of relatively low heat capacity gases, thereby reducing the possibility of cracking of hydrocarbons. in addition to controlling the temperature of the first and second oxygen-free gas streams, the flow rate of such first and second oxygen-free gas streams forced through bed 15 in first and second retorting zones 22 and 23 is varied by changing the pressure created by the fans (not shown) which drive such gas streams in order to regulate the quantity and type of oils distilled into the gas stream in the respective retorting zones. In alternative embodiments having a plurality of retorting zones, a pollutant such as hydrogen sulfide is removed by controlling the temperature and flow rate of the gas stream passed through the moving shale bed in one retorting zone so that the pollutant will have a higher concentration in the off-gases from such zone and isolating the off-gases exiting from such zone. In still other embodiments, a gaseous chemical feedstock such as ethylene is removed from the oil shale by controlling the temperature and/or flow rate of nonoxidizing gas stream which passes through the moving shale bed in the retorting zone and isolating the off-gases exiting from such zone.

The temperature of particles 10 of moving bed 15 exiting second preheating zone 21 may approach retorting temperature and result in undesirably distilling light oil from particle 10 in zone 21 into the second gas stream in which the heavier oil fraction is entrained. In order to prevent such mixing of light and heavy oil fractions and to maintain this segregation thereof, in alternative embodiments the second gas stream exiting second retorting zone 23 is passed through moving bed 15 in first preheating zone 20 and the first gas stream exiting first retorting zone 22 is passed through moving bed 15 in second preheating zone 21.

At the completion of retorting, the spent shale particles 10 of bed 15 are transported by rollers 12 to combustion zone 24 where preheated combustion air is burned with the residual carbon in particles 10 to thus extract all heat energy from the spent oil shale particles 10. Ambient air is conveyed to cooling zone 25 through a conduit 58 communicating with wind box structure 37f and is passed updraft through bed 15 within cooling zone 25 to preheat the combustion air stream and also cool the spent shale particles 10. The preheated combustion air from cooling zone 25 is sent to combustion zone 24 through a conduit 60 which communicates at its opposite ends with hood structure 33f and with wind box structure 37e. Such preheated combustion air stream is passed updraft through bed 15 in combustion zone 24 and burned with the residual fixed carbon in the spent shale particles 10 within combustion zone 24. Combustion zone off-gases may be at approximately 2300° F. and are sent to heat exchanger 50 through a conduit 62 which communicates with hood structure 33e and are passed through heat exchanger 50 which may be of the type disclosed in U.S. Pat. No. 3,644,193 and wherein a portion of the heat is recovered and transferred to the first and second recycled nonoxidizing gas streams which are sent to the first and second retorting zones 22 and 23. After passing through heat exchanger 50 the combustion zone off-gases still contain a significant amount of medium-level heat that can be used in a waste heat boiler (not shown) which could, for example, generate electricity for the oil shale retorting system.

In general, the ratio of hydrogen to carbon of the volatile products distilled from the kerogen in western oil shale is higher than in eastern shale and consequently less liquid product is produced and more residual carbon remains in the spent particles 10 after retorting of eastern shales. Because the amount of carbon remaining in the spent shale products is higher, the amount of heat generated by burning the fixed carbon in the particles with combustion air in combustion zone 24 will be higher with eastern shales and consequently the flow rate of the combustion air stream through combustion zone 24 and cooling zone 25 will be higher when eastern shale is being retorted than when western shale is being retorted.

In an alternative embodiment (not shown) the gases exiting cooling zone 25 are not passed through combustion zone 24, air at atmospheric temperature is passed through bed 15 in both combustion zone 24 and cooling zone 25 to limit the temperature rise within combustion zone 24, and the gases exiting both zones are combined and sent to heat exchanger 50. In this embodiment substoichiometric air prefereably furnished to combustion zone 24 to provide a high percentage of carbon monoxide in the exiting gases.

Nonuniform size oil bearing shale particles 10 fed into roller grate 18 are continuously agitated as they are transported by rollers 12 onto and across filler bars 14 and quickly segregate in size with the coarser particles remaining at the top of bed 15 and the finer material settling to the bottom of the bed. This is advantageous in first and second retorting zones 22 and 23 because downdraft heated first and second nonoxidizing gas streams are passed through bed 15 in such retorting zones and the larger shale particles 10 are exposed to the hottest gases for the longest time. The smaller shale particles 10 that are retorted faster and do not require as high temperature for eduction of oil are advantageously exposed to a lower average gas temperature. Roller grate 18 transports shale particles 10 at the bottom of bed 15 at higher velocity than particles adjacent the top of the bed, and consequently the smaller shale particles at the bottom of the bed, which do not require as much time to retort as the larger particles, remain in the retorting zones 22 and 23 for shorter times.

Figure 3:
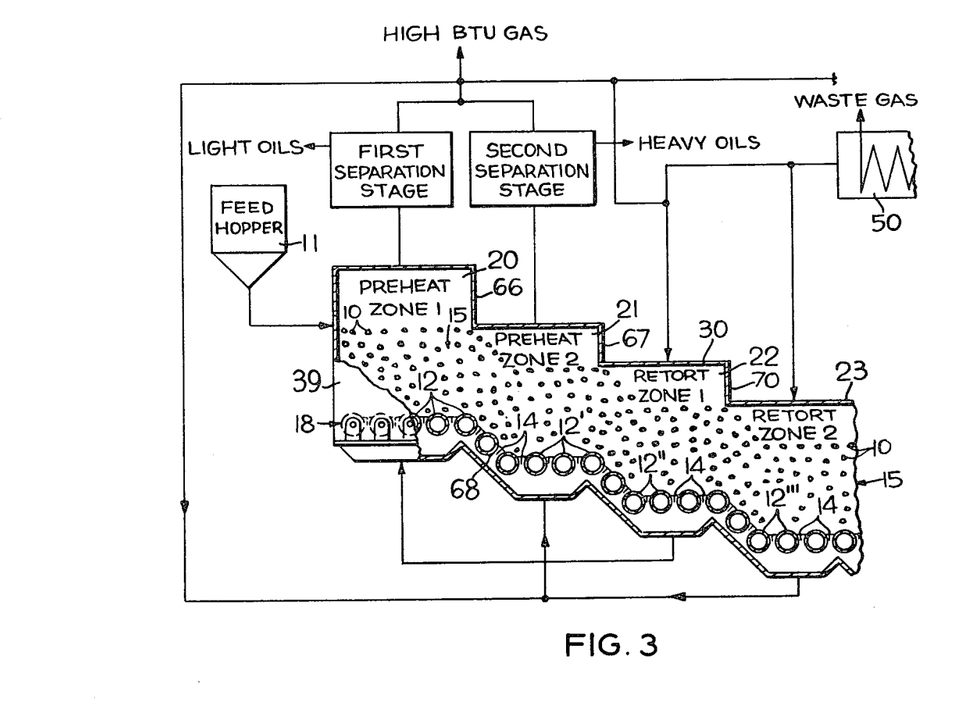
FIG. 3 shows diagrammatically and partially an alternative moving bed oil shale retorting apparatus in which partitioning between zones is accomplished by arrangements of the grate rollers in tiers.

FIG. 3 diagrammatically illustrates an alternative embodiment of the invention which differs from the FIG. 1 embodiment in that the grate rollers 12 in sequential zones in a downsteam direction are positioned at progressively lower levels, or tiers, to eliminate the partitions 32 provided between adjacent zones in the FIG. 1 embodiment. A plurality of first rollers 12 are preferably arranged in a first horizontal plane, or tier within first preheat zone 20 and receive the shale particles 10 fed from hopper 11 and convey shale bed 15 in a depth established by depending wall member 66. A plurality of second rollers 12' within second preheat zone 21 downstream from first rollers 12 are arranged in a second horizontal plane at an elevation lower than the first tier and convey moving shale bed 15 in a depth established by depending wall member 67. One or more intermediate rollers such as 68 may be positioned at elevations between the first and second tiers so that the bed-transporting surface defined by rollers 12, 68 and 12' and filler bars 14 are inclined at an angle to the horizontal at a point between the first rollers 12 and second rollers 12'. Similarly a plurality of third rollers 12" within first retorting zone 22 downstream from second rollers 12' are arranged in a third horizontal plane at an elevation lower than the second tier and convey moving shale bed 15 in a depth established by depending wall member 70. The rollers in succeeding zones 22, 23, 24 and 25 may similarly be at progressively lower levels in a manner analagous to that disclosed in U.S. Pat. No. 4,269,593 having the same assignee as this invention.

In certain embodiments of the invention rollers 12 in preheating zones 20, 21 and retorting zones 22, 23 may be disposed in planes inclined to the horizontal rather than in horizontal planes as illustrated in FIGS. 1 and 3.

It will be appreciated that the tangential frictional forces exerted on particles 10 by rollers 12 transport particles 10 onto and across filler bars 14 to continuously agitate the shale particles and thereby improve solid-to-gas contact in comparison to a traveling grate "static" bed. Such continuous agitation of particles 10 in bed 15 and improved solid-to-gas contact allows retorting to occur faster, which improves the oil yield from the shale, and also reduces the time during which cracking of the liquid hydrocarbons can occur in comparison to a traveling grate "static" bed.

The embodiments of the invention in which an exclusive property or privilege is claimed are defined as follows:

1. A method of recovering oil from oil bearing shale particles comprising the steps of
forming a non-fluidized bed of said particles on a plurality of rotatable horizontal apertured cylindrical rollers having elongated filler members in the nip between adjacent rollers with the upper surfaces of said filler members disposed below the upper surfaces of said rollers,
transporting said bed along a path of travel transverse to the axes of said rollers by rotating said rollers to frictionally engage their cylindrical surfaces with said particles and transfer said particles onto and across said filler members and continuously agitate said particles as they are transported, said roller rotating step being at a circumferential velocity substantially higher than the velocity of said bed along said path of travel,
passing through the apertures in said rollers and said bed at spaced apart points along said path of travel a plurality of discrete streams of nonoxidizing gas free of products of combustion and heated to different temperatures sufficiently high to vaporize and educe different weight fractions of the oil from said particles as vapors into said gas streams, said temperatures being below the cracking temperatures of said fractions,
individually withdrawing said gas streams along said bed, and
separating said different weight oil fractions from said gas streams.

2. A method of recovering oil from oil bearing shale particles comprising the steps of
forming a non-fluidized bed of said particles on a plurality of horizontal cylindrical rollers having gas passage apertures therein and elongated filler members in the nip between adjacent rollers,
transporting said bed along a path of travel transverse to the axes of said rollers by rotating said rollers to frictionally engage their cylindrical surfaces with said particles and transfer said particles onto and across said filler members and continuously agitate said particles as they are transported, the upper surfaces of said filler members being disposed below the upper surfaces of said rollers and said roller rotating step being at a circumferential velocity substantially higher than the velocity of said bed along said path of travel,
passing through said gas passage apertures in said rollers and said bed at spaced apart first and second points along said path of travel first and second streams of nonoxidizing gas free of products of combustion and heated to first and second different temperatures sufficiently high to vaporize and educe a first relatively light and a second relatively heavy fraction of the oil from said particles as vapors into said first and second gas streams respectively, said first and second temperatures being below the cracking temperatures of said light and heavy fractions,
individually withdrawing said first and second gas streams along said bed, and
separating said first relatively light and said second relatively heavy oil fractions from said first and second gas streams respectively.

3. A method in accordance with claim 2 and including the step of passing at least one of said streams of nonoxidizing gas through said gas passage apertures in said rollers and said bed at a point upstream from said first and second points to preheat said bed.

4. A method in accordance with claim 2 and including the step of passing a stream of combustion air through said gas passage apertures in said rollers and said bed at a point downstream from said first and second points and burning said combustion air with carbon in said oil shale particles to supply heat to said combustion air stream; and
transferring heat from said heated combustion air stream to at least one of said nonoxidizing gas streams to raise it to oil educing temperature.

5. A method in accordance with claim 4 wherein said step of passing said second nonoxidizing gas stream through said gas passage apertures in said rollers and said bed at said second point includes conveying said one nonoxidizing gas stream thereto directly from said heat transfer step.

6. A method in accordance with claim 4 wherein said step of passing said first nonoxidizing gas stream through said gas passage apertures in said rollers and said bed at said first point includes blending recycled gas from which at least one of said oil fractions has been removed in said separating step with gas from said one nonoxidizing gas stream to cool the latter and passing the resulting blend of gases through said gas passage apertures in said rollers and said bed at said first point.

7. A method in accordance with claim 4 wherein said step of transferring heat from said heated combustion air stream to said at least one of said nonoxidizing gas streams transfers said heat to recycled gas from which at least one of said oil fractions has been removed in said separating step.

8. A method of recovering oil from oil bearing shale particles comprising the steps of
continuously feeding said particles onto a plurality of rotatable horizontal cylindrical rollers having gas passage apertures therein,
forming a non-fluidized bed of said particles on said rollers,
continually transferring said particles onto and across elongated filler members disposed in the nip between adjacent rollers by rotating said rollers to frictionally engage the cylindrical surfaces thereof with said particles and continuously agitate said particles and transport said bed along a path of travel transverse to the axes of said rollers, the upper surfaces of said filler members being disposed below the upper surfaces of said rollers and said roller rotating step being at a circumferential velocity substantially higher than the velocity of said bed along said path of travel,
passing through said gas passage apertures in said rollers and said bed at a first point a first stream of nonoxidizing gases free of products of combustion and heated to a first temperature required to vaporize and educe a first light fraction of the oil from said particles as a vapor into said first gas stream, said first temperature being below the cracking temperature of said first fraction,
passing through said gas passage apertures in said rollers and said bed, at a second point downstream along said path of travel from said first point, a second stream of nonoxidizing gases free of products of combustion and heated to a second temperature sufficiently higher than said first temperature to vaporize and educe a second fraction of the oil heavier than said first fraction as a vapor from said particles into said second gas stream, said second temperature being below the cracking temperature of said second fraction,
individually withdrawing said first and second gas streams along said bed, and
separating said first light and said second heavy oil fractions from said first and second gas streams respectively.

9. A method in accordance with claim 2 or 8 and including the step of passing said first and said second nonoxidizing gas streams through said gas passage apertures in said rollers and through said bed prior to said separating steps at third and fourth points spaced apart along said path of travel and upstream from said first and second points to preheat said bed and cool said first and second gas streams to condensing temperatures to condense the educted oils to a mist in the first and second gas streams that can be separated therefrom after they have passed through said bed at said third and fourth points respectively.

10. A method in accordance with claim 9 and including the steps of passing a stream of combustion air through said gas passage apertures in said rollers and said bed at a fifth point downstream from said first and second points and burning said combustion air with said carbon in said oil shale particles to supply heat to said combustion air stream, and
subsequently transferring heat from said heated combustion air stream to said first and said second nonoxidizing gas streams to raise them to said first and to said second oil educing temperatures respectively before they pass through said bed to vaporize and educe oil from said particles at said first and second points.

11. A method in accordance with claim 10 and including the step of passing said stream of combustion air through said gas passage apertures in said rollers and said bed at a sixth point downstream from said fifth point and before said combustion air stream is passed through said bed at said fifth point to thereby preheat said combustion air stream and cool said particles after they are burned with said combustion air.

12. A method of recovering oil shale from oil bearing shale particles comprising the steps of
continuously feeding onto and forming a non-fluidized bed of said particles on rotatable horizontal apertured rollers having a depth several times the average diameter of said particles,
rotating said rollers to frictionally engage the cylindrical surfaces thereof with the particles in the lowermost layer of said bed and continually transfer them onto and across elongated filler members disposed in the nip between adjacent rollers to agitate said particles and transport said bed along a path of travel transverse to the axes of said rollers defining a downstream direction and through a first retorting zone and a second retorting zone in sequence in said downstream direction, the upper surfaces of said filler members being disposed below the upper surfaces of said rollers and said roller rotating step being at a circumferential velocity substantially higher than the velocity of said bed along said path of travel,
passing through the apertures in said rollers and said bed in said first retorting zone a first stream of nonoxidizing gases free of products of combustion and heated to a first temperature in the range from 600° F. to 900° F. required to vaporize and educe a relatively light fraction of the oil as a vapor from said particles into said first gas stream, said first temperature being below the cracking temperature of said light fraction,
passing through the apertures in said rollers and said bed in said second retorting zone a second stream of nonoxidizing gases free of products of combustion and heated to a second temperature higher than said first temperature and in the range from 900° F. to 1200° F. required to vaporize and educe a relatively heavy fraction of the oil as a vapor from said particles into said second gas stream, said second temperature being below the cracking temperature of said heavy fraction,
individually withdrawing said first and second gas streams along said bed, and
separating said first light and said second heavy oil fractions from said first and second gas streams, respectively.

13. A method in accordance with claim 12 wherein said roller rotating step transports said bed in sequence in said downstream direction through a first preheating zone and a second preheating zone upstream from said first and second retorting zones, and said method includes passing said first and second gas streams exiting said first and second retorting zones respectively through said apertures in said rollers and said bed in said first preheating zone and through said apertures in said rollers and said bed in said second preheating zone prior to said separating step to preheat said bed and cool said first and second gas streams to condensing temperatures to condense the educted oils to a mist in said first and second gas streams that can be separated therefrom after they have passed through said bed in said first and second preheating zone.

14. A method of recovering oil shale from oil bearing shale particles comprising the steps of continuously feeding onto and forming a non-fluidized bed of said particles on a plurality of horizontal apertured cylindrical rollers having a depth greater than several times the average diameter of said particles, rotating said rollers to frictionally engage the cylindrical surfaces thereof with the particles in the lowermost layer of said bed and continually transfer them onto and across elongated filler members disposed into the nip between adjacent rollers to agitate said particles and transport said bed along a path of travel transverse to the axes of said rollers defining a downstream direction and through a first preheating zone, a second preheating zone, a first retorting zone, and a second retorting zone in sequence in said downstream direction, the upper surfaces of said filler members being disposed below the upper surfaces of said rollers and said roller rotating step being at a circumferential velocity substantially higher than the velocity at which said bed is transported, passing through said apertures in said rollers and said bed in said first retorting zone a first stream of nonoxidizing gas free of products of combustion and heated to a first temperature required to vaporize and educe a relatively light fraction of the oil from said particles as a vapor into said first nonoxidizing gas stream, passing through the apertures in said rollers and said bed in said second retorting zone a second stream of nonoxidizing gas free of products of combustion and heated to a second temperature required to vaporize and educe a relatively heavy fraction of the oil from said particles as a vapor into said second gas stream, said second temperature being below the cracking temperature of the educted oils, passing said first gas stream exiting said first retorting zone through the apertures in said rollers and said bed in said first preheating zone to preheat said bed and cool the first gas stream to condensing temperature to condense said relatively light oil to a mist in the first gas stream that can be separated after the first gas stream has passed through said bed in said first preheating zone, passing said second gas stream exiting said second retorting zone through the apertures in said rollers and said bed in said second preheating zone to further preheat said bed and cool the second gas stream to condensing temperature to condense said relatively heavy oil to a mist in the second gas stream that can be separated after the second gas stream has passed through said bed in said second preheating zone, separating said light oil fraction from said first gas stream exiting said first preheating zone, and separating said heavy oil fraction from said second gas stream exiting said second preheating zone.

15. A method in accordance with claim 14 wherein said roller rotating step also transports said bed in sequence through a combustion zone and a cooling zone downstream from said first and second retorting zones, and said method includes passing a stream of combustion air through the apertures in said rollers and said bed in said cooling zone to preheat said combustion air and to cool the spent shale particles, passing said stream of combustion air exiting said cooling zone through the apertures in said rollers and said bed in said combustion zone and burning said combustion air with carbon in said particles within said combustion zone to supply heat thereto, and transferring heat from said combustion air exiting said combustion zone to said first and second nonoxidizing gas streams to raise the temperature thereof to said first and to said second oil educing temperatures respectively.

16. A method in accordance with claim 12 or 14 wherein said steps of passing first and second nonoxidizing gas streams through the apertures in said rollers and said bed in said first and second retorting zones includes passing recycled gases from which said light and heavy oil fractions have been removed by said light oil and heavy oil separating steps through the apertures in said rollers and said bed in said retorting zones.

17. A method of recovering oil from oil shale bearing particles comprising the steps of transporting a bed of said particles along a generally horizontal path of travel and continuously agitating said particles by forming a non-fluidized bed of said particles on a plurality of rotatable horizontal cylindrical rollers having gas passage apertures therein and elongated filler members in the nip between adjacent rollers disposed below the upper surfaces of said rollers, educing a plurality of different weight fractions of oil from said particles by passing a plurality of discrete oxygen-free gas streams through said gas passage apertures in said rollers and said bed at spaced apart points along said path of travel which gas streams are free of products of combustion and have been heated to different oil educing temperatures, heating a stream of combustion air by passing it through said gas passage apertures in said rollers and said bed downstream from said spaced apart points at which said different fractions of oil are educed and burning said combustion air with the carbon in said particles, transferring heat energy from said heated combustion air stream to said oxygen-free gas streams to raise the temperatures thereof to said different oil educing temperatures, individually withdrawing said gas streams along said bed, and separating said different weight fractions of educted oil from said oxygen-free gas streams.

18. A method in accordance with claim 17 and including the step of preheating said bed and cooling said oxygen-free gas streams to condensing temperatures to condense said different weight fractions of oil to a mist therein prior to said separating step by passing said plurality of oxygen-free gas streams through said gas passage apertures in said rollers and said bed at spaced apart points along said path of travel upstream from said spaced apart points at which said different fractions are educed.

19. A method of recovering oil shale from oil bearing shale particles comprising the steps of continuously feeding onto and forming a non-fluidized bed of said particles on rotatable horizontal cylindrical rollers having gas passage apertures therein, said bed having a depth greater than several times the average diameter of said particles, rotating said rollers to frictionally engage the cylindrical surfaces thereof with said particles and continually transfer them onto and across elongated filler members disposed in the nip between adjacent rollers to agitate said particles and transport said bed along a path of travel transverse to the axes of said rollers defining a downstream direction and through a first retorting zone, a second retorting zone, a combustion zone, and a cooling zone in sequence in said downstream direction, the upper surfaces of said filler members being disposed below the upper surfaces of said rollers and said roller rotating step being at a circumferential velocity substantially higher than the velocity at which said bed is transported, passing a stream of combustion air through said gas passage apertures in said rollers and said bed in said cooling zone to preheat said combustion air and to cool the spent shale particles, passing the heated combustion air stream exiting said cooling zone through said gas passage apertures in said rollers and said bed in said combustion zone and burning said combustion air with the carbon in said particles in said combustion zone to heat said combustion air, transferring heat from said heated combustion air exiting said combustion zone to a first oxygen-free gas stream devoid of products of combustion to raise the temperature thereof and passing said heated first gas stream through said gas passage apertures in said rollers and said bed in said first retorting zone to elevate the temperature of the particles to an oil educting temperature to drive off relatively light oil as a gas from particles, transferring heat from said heated combustion air exiting said combustion zone to a second oxygen-free gas stream devoid of products of combustion to raise the temperature thereof above the temperature to which said first gas stream is heated and passing said second gas stream through said gas passage apertures in said rollers and said bed in said second retorting zone to elevate the temperature of the particles to an oil educting temperature higher than that in said first retorting zone to drive off relatively heavy oil as a gas from the particles, individually withdrawing said first and second gas streams along said bed, and separating said relatively light oil from said first gas stream and said relatively heavy oil from said second gas stream.

20. A method in accordance with claim 19 wherein said roller rotating step also transports said bed in sequence in said downstream direction through a first preheating zone and a second preheating zone upstream from said first and second retorting zones, and said method includes passing said first and second oxygen-free gas streams exiting said first and second retorting zones respectively through said gas passage appertures in said rollers and said bed in said first preheating zones and through said gas passage apertures in said rollers and said bed in said second preheating zone prior to said separating step to preheat said bed and cool said first and second gas streams to condensing temperatures to condense the educted oils to a mist in the first and second gas streams that can be separated therefrom after they have passed through said bed in said first and second preheating zones.

21. A method of retorting shale particles containing kerogen comprising the steps of forming a non-fluidized bed of said particles on a plurality of rotatable horizontal cylindrical rollers having gas passage apertures therein and elongated filler members in the nip between adjacent rollers with the upper surfaces of said filler members disposed below the upper surfaces of said rollers, transporting said bed along a path of travel transverse to the axes of said rollers by rotating said rollers to frictionally engage their cylindrical surfaces with said particles and transfer said particles onto and across said filler members and continuously agitate said particles as they are transported, said roller rotating step being at a circumferential velocity substantially higher than the velocity of said bed along said path of travel, passing through said gas passage apertures in said rollers and said bed at spaced apart points along said path of travel a plurality or discrete streams of nonoxidizing gas devoid of products of combustion and heated to different temperatures sufficiently high to vaporize and educe different gaseous components from the kerogen in said particles as vapors into said gas streams, individually withdrawing said gas streams along said bed, and separating said different components from said gas streams.

* * * * *